Patented Feb. 22, 1944

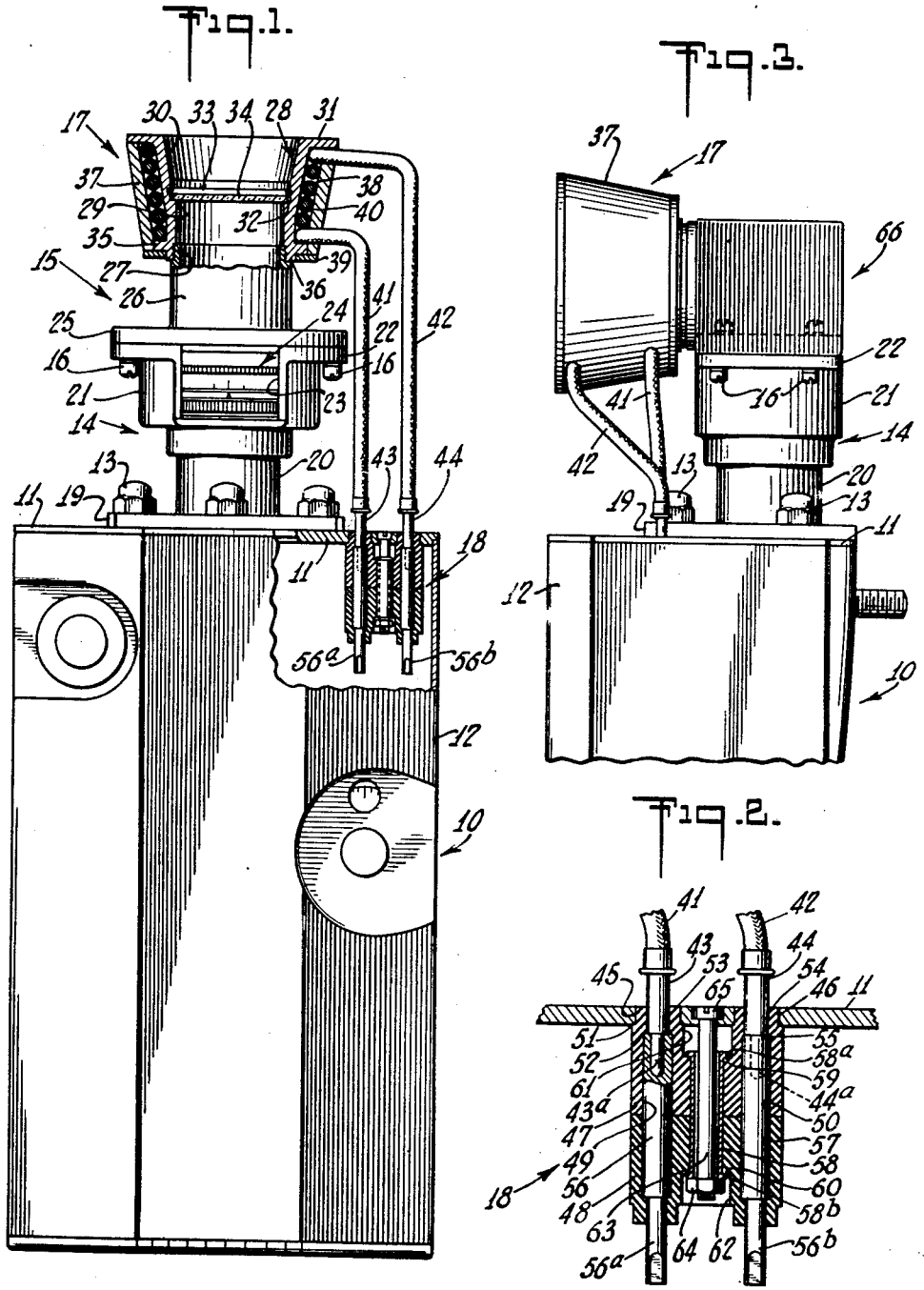

2,342,513

UNITED STATES PATENT OFFICE 2,342,513

CAMERA

Clinton B. Gaty, Alexandria, Va., assignor to Fairchild Aviation Corporation, Jamaica, N. Y., a corporation of Delaware Original application November 19, 1941, Serial No. 419,684, now Patent No. 2,325,313, dated July 27, 1943. Divided and this application September 16, 1942, Serial No. 458,506

3 Claims. (Cl. 219—19)

This invention relates to a lens heating device and to an electrical connection therefor for a motion picture camera adapted to photograph the results of actual or simulated aerial machine gun fire.

The complexity and amount of equipment, instruments, controls, etc., installed in the cockpit of a modern military airplane, particularly an airplane of the fighter or interceptor type, so crowds the cockpit that there is but little space therein other than what is essential for the pilot's activities. This is particularly true in those types of fighter airplanes carrying rigidly mounted wing guns which are trained on the target by pointing the airplane in accordance with the position of the target, as viewed in a gun sight mounted in the cockpit. Accordingly, such equipment or instruments, other than those absolutely necessary, and proposed for installation in the cockpit, must of necessity be as small and as light as is consonant with efficient operation.

It is often desirable to equip modern military aircraft of the above type with motion picture cameras of the nature described in the copending application of Gaty et al., Serial No. 395,098, filed May 24, 1941. These cameras are, in certain instances, mounted in the cockpit adjacent the gun sight in a position to photograph the viewing plate of the gun sight, and in other instances are attached directly to the wing gun. In each instance there is so little space for the camera that it and its attachments must be as small as possible.

A camera of this sort is, of course, subjected to severe usage by reason of vibration, weather conditions and low temperatures at the substantial altitudes at which it operates. Thus, the space limitations of the cockpit or airplane wings, which necessitate crowding the operating mechanism of the camera into as small a space as possible, and the conditions under which the camera must operate, give rise to a number of problems difficult of solution. Not the least of these problems arises in the attempt to keep the camera lens, and such filters as may be necessary, in proper operative condition so as to obtain the best photographic results.

The camera itself is so small as to have but little available space within for the disposition of a heater or for electric conductor receptacles. Also, as the camera is often subjected to substantial shock and vibration when the gun is fired, there is an ever present tendency to dislocate the heater and its electrical connections. Inasmuch as the altitude, and accordingly the temperature at which the camera operates undegoes frequent and substantial changes, it is important to utilize fully the heating capacity of the heater. This factor complicates the mounting of the heater and the electrical connection thereof with the source of current.

Accordingly it is among the objects of this invention to provide a lens heating device and electrical connection therefor capable among other things of keeping the lens in proper operative condition, and yet be of such nature as to occupy a minimum amount of space and withstand all shocks and vibration to which it may be subjected. Other objects will be in part apparent and in part pointed out hereinafter.

The invention accordingly consists in the features of construction, combinations of elements, and arrangements of parts as will be exemplified in the structure to be hereinafter described, and the scope of the application of which will be indicated in the following claims.

This application is a division of the copending application of Clinton B. Gaty, entitled "Camera lens heating device," Serial No. 419,684, filed November 19, 1941, issued July 27, 1943, as Patent No. 2,325,313.

In the drawing:

Figure 1 is a full scale elevation of a motion picture camera on which my lens heating device and electrical connection therefor is mounted, certain portions being shown in section, and a portion of the camera being broken away to show more clearly a portion of the electrical connection;

Figure 2 is an enlarged fragmentary sectional elevation of a portion of the electrical connection shown in Figure 1; and, Figure 3 is a fragmentary side elevation of my lens heating device mounted on a lens system of a type different from that shown in Figure 1.

Similar reference characters refer to similar parts throughout the various views of the drawing.

In Figure 1, I have generally indicated at 10 a motion picture camera which in most respects is substantially identical to that shown and described in detail in the copending application of Gaty et al., Serial No. 395,098, filed May 24, 1941, mentioned above. The camera includes a top plate 11 which may be secured in any suitable manner to the casing 12, and has secured thereto as by bolts 13 a lens support generally indicated at 14 within which the camera lens (not shown) is mounted. A filter support, generally indicated at 15 is detachably secured to lens support 14 as by screws 16, and on support 15 is detachably mounted a filter and heater assembly generally indicated at 17 which is electrically connected, as will be described hereinbelow, to a conductor receptacle or electric plug socket generally indicated at 18.

Lens support 14 includes a generally flat base 19 through which bolts 13 extend to secure the lens support to camera top plate 11. Extending upwardly from base 19 is a tubular housing 20 which is widened at its top to provide a generally cylindrical casing 21 flanged as at 22. Casing 21 is apertured as at 23 to provide access to the usual diaphragm adjusting rings 24. It will now appear that the camera lens and the diaphragm adjusting mechanism is partially enclosed, and accordingly partially protected by lens support 14. In other words, the camera lens and the diaphragm mechanism are disposed in a space, the temperature of which, as will appear below, can be controlled to a certain extent to maintain the lens and diaphragm in proper operative condition.

Filter support 15 includes a flange 25 which is secured to flange 22 of lens support 21 by screws 16. Extending upwardly from flange 25 is a cylinder 26, the upper end of which is reduced and threaded as at 27, and it is on this threaded portion of the filter support that filter and heater assembly 17 is detachably mounted. It might be noted at this point that filter support 15 provides a continuation of what is in effect a duct formed by lens support 14.

The filter and heater assembly 17 comprises a more or less tubular member generally indicated at 28 comprising a cylindrical portion 29 and a frusto-conical portion 30 having an outwardly extending annular flange 31. A shoulder 32 is formed within member 28 to provide a seat for a filter 33 which may be held in proper position by a snap ring 34 adapted to snap into a small groove provided therefor, and rest against the edge of the outer surface of the filter. Cylindrical portion 29 of the member 28 is also provided with an annular flange 35 from which extends an interiorly threaded portion 36 by which the assembly 17 is detachably mounted on filter support 15. A frusto-conical band 37 is disposed about the member 28 so as to form therewith a space 38. Band 37 engages flanges 31 and 35, and is held in assembly with the member 28 against these flanges by a retaining ring 39 which may be secured to flange 35 in any suitable manner. Within the space 38 formed by band 37 and member 28 is a heater coil 40 formed by a length of insulated wire, the ends 41 and 42 of which extend through suitable holes formed in band 37, and have attached thereto respectively jacks 43 and 44 which may be connected to socket 18, as will be described.

It may now be seen that the filter and heater unit 17 is self-contained and readily attachable to or detachable from filter support 15. Furthermore, cylindrical portion 29 of the assembly 17 provides a further elongation of the duct formed by lens support 14 and filter support 15, and the space within this duct between filter 33 and the camera lens, which is disposed adjacent the joint between flanges 22 and 25 of the lens and filter supports 14 and 15, respectively, is substantially a dead air space. Thus, when heater coil 40 is energized, this dead air space is heated, and also the metal portions of assembly 17 are heated, resulting in heating of filter 33 by both convection and conduction. Furthermore, as member 28 of the heater and filter assembly 17 is directly connected to filter support 15, and as the filter support directly engages lens support 14, these metal parts are all heated upon energization of the heater, as well as the air space enclosed thereby. Thus, the camera lens, which is disposed adjacent the top of the lens mount, is also heated both by convection and conduction. Inasmuch as the metal parts are good conductors of heat, and also are capable of retaining heat for a reasonable period of time, the lens and filter are maintained sufficiently warm, regardless of abrupt variations in altitude, and accordingly temperature.

As noted hereinabove, camera 10 is, during its operation, subject to substantial shock, and even when not operating is subject to substantial shock from gun recoil and substantial vibration from the airplane. Under these conditions, I have found that to attach the ends or leads 41 and 42 of heater 40 to a conventional plug is unsatisfactory, as the plug, by reason of its relatively substantial inertia, is apt to work loose from the receptacle or socket into which its conductors extend. Also, because of the substantial current, which may be as high as 10 amperes, necessary to energize heater 40, the conductors of such a conventional plug would have to be of such a size that there would be insufficient room on top plate 11 of the camera on which to mount such a plug. I, accordingly, have provided jacks 43 and 44 and socket 18 for the reception thereof, which will now be described.

As more clearly shown in Figure 2, top plate 11 is drilled as at 45 and 46 to provide a pair of holes for the reception of jacks 43 and 44 into socket 18. Socket 18 comprises a pair of casings 47 and 48, and as these are identical, casing 47 only will be described. Thus, casing 47, which is preferably formed from a suitable dielectric material, is so molded as to provide a pair of chambers 49 and 50, which are parallel, and extend throughout the casing. Adjacent the upper end of chamber 49, the casing is shouldered as at 51 and 52, forming a reduced portion 53 which extends into hole 45 in camera top 11, being restrained from projecting past the top surface of top 11 by shoulder 51. A similar projection 54 is formed adjacent the upper end of chamber 50, and this projection extends into hole 46. Chamber 50 is also provided with a shoulder 55, similar to shoulder 52. Chambers 49 and 50, respectively, receive the upper or female ends of conductors 56 and 57, into which the reduced ends 43a and 44a of jacks 43 and 44 extend when the jacks are connected to socket 18. It may now be seen that conductors 56 and 57 are not only insulated from one another by casing 47, but are also amply insulated, as are jacks 43 and 44, from camera top 11 by projections 53 and 54 of the casing.

Casing 48 is provided with channels similar to the channels in casing 47 and these latter channels receive the lower or male ends of conductors 56 and 57, these male ends 56a and 56b extending from the bottom of casing 48, and being insulated from one another as in the case of the female ends of the conductors. Male ends 56a and 56b (Figure 1) may be attached to suitable leads within the camera, which are connected to the main plug receptacle of the camera (not shown) but preferably these male ends are connected in series with a thermostat (not shown) mounted within camera casing 12, which automatically completes the circuit to heater 40 at a predetermined temperature.

Referring back to Figure 2, casings 47 and 48 are provided with coaxial centrally disposed bores in which is disposed an eyelet 58, the opposite ends 58a and 58b of which are riveted or spun over to engage respectively shoulders 59 and 60, formed at the bottoms of recesses 61 and 62, respectively, in casings 47 and 48. Eyelet 58 thus holds the two casings together and furthermore provides a hole for the reception of a screw 63, which extends through top plate 11 and has threaded on the lower end thereof a nut 64 which when taken up on the screw holds socket 18 securely against the under side of top 11. Preferably top 11 is countersunk to receive the head 65 of screw 63 so that the top of the screw is flush with the surface of top plate 11. It will now appear that socket 18 is firmly secured to the camera top plate 11 in such a manner as to preclude its working loose by reason of gun recoil or plane vibration. Furthermore, the conducting portions of the socket, as well as jacks 43 and 44, are completely insulated from top plate 11, as well as from one another, and in spite of the small size of the socket (see Figure 1) are well able to carry the substantial current necessary to energize heater 40. Furthermore, by reason of the small size of socket 18 it may be disposed within the camera where there is no danger of its being broken or knocked loose, and in spite of its small size, it is quite capable of receiving jacks 43 and 44 which, because of their relatively slight weight, have insufficient inertia to cause their working loose from recoil shock or airplane vibration.

When camera 10 is installed in the cockpit adjacent a gun sight of the type shown in the copending application of Gaty et al., Serial No. 395,098, filed May 24, 1941, it is usually necessary to secure to lens mount 14 (Figure 3) an erecting system which I have here generally indicated at 66. By means of this erecting system, the optical axis of the camera lens may be disposed at an angle to the viewing axis, i. e., the axis of heater and filter assembly 17. In this case, assembly 17 is mounted directly on the erecting system 66 which, accordingly, in addition to its designed function, functions somewhat in the manner outlined above with respect to filter support 15 (Figure 1). In other words, the assembly 17, the erecting system 66, and the lens support 14, provide conduction and convection paths for the flow of heat from the heater in assembly 17.

It may now be seen that I have provided a lens heating device and an electrical connection therefor which attains the several objects set forth hereinabove in a thoroughly practical and efficient manner.

As many possible embodiments may be made of the above invention, and as many changes might be made in the embodiment above set forth, it is to be understood that all matter hereinbefore set forth, or shown in the accompanying drawing, is to be interpreted as illustrative and not in a limiting sense.

I claim:

1. The combination with a small motion picture camera of a type adapted to be attached to a military airplane for photographing the effects of machine gun or cannon fire, of a lens mounted on said camera, a tube-like support surrounding said lens and extending a substantial distance from said camera, means for securing said support to said camera, a filter carrying member detachably mounted on the outer end of said support, a filter mounted in said member, said member having an annular chamber therein, a coil of wire comprising a heater mounted in said chamber for heating said filter by conduction and said lens by conduction and convection, an electric plug receiving device mounted within said camera, and means forming an electrical connection between said device and said heater.

2. The combination with a small motion picture camera of a type adapted to be attached to an airplane of a lens mounted on said camera, a tube-like support surrounding said lens and extending a substantial distance from said camera, means for securing said support to said camera, an optical element carrying member detachably mounted on the outer end of said support, an optical element mounted in said member, said member having an annular chamber therein, a coil of wire comprising a heater mounted in said chamber for heating said lens and said optical element by conduction and convection, an electric plug receiving device mounted within said camera, and means forming an electrical connection between said device and said heater.

3. The combination with a small motion picture camera of a type adapted to be attached to a military airplane for photographing the effects of machine gun or cannon fire, of a lens mounted on said camera, a tube-like support surrounding said lens and extending a substantial distance from said camera, means for securing said support to said camera, a filter carrying member detachably mounted on the outer end of said support, a filter mounted in said member, said member having an annular chamber therein, a coil of wire comprising a heater mounted in said chamber for heating said filter by conduction and said lens by conduction and convection, an electric plug receiving device mounted within said camera, a pair of elongated flexible leads connected to said coil and extending therefrom externally of said tube-like support, and a pin jack secured to each of said leads for insertion in said plug receiving device to form a connection between said device and said coil.

CLINTON B. GATY.